UNITED STATES PATENT OFFICE.

CHARLES D. ST. PIERRE, OF BROOKLYN, NEW YORK.

SHOE-BLACKING.

SPECIFICATION forming part of Letters Patent No. 401,390, dated April 16, 1889.

Application filed October 6, 1888. Serial No. 287,400. (Specimens.)

*To all whom it may concern:*

Be it known that I, CHARLES D. ST. PIERRE, a citizen of Great Britain, and a resident of Brooklyn, in the county of Kings and State of New York, have invented certain new and useful Improvements in the Composition of a Shoe Blacking or Polish, of which the following is a specification.

My invention relates to that class of boot and shoe blacking or polish known as "liquid" or "semi-liquid," and is composed of ivory-black, sugar, linseed-tea, sweet-oil, Diamond black dye, vinegar, oil of vitriol, whisky, wormwood-tea, nux-vomica liquid, and alum, mixed and compounded in certain proportions and in a manner which will be hereinafter more fully described.

The object of my invention is to provide a blacking or polish for boots, shoes, or other leather articles, which can be readily applied, and by which a quick, lasting, and very desirable polish may be obtained.

I am aware that there are at present on the market liquid blackings which are applied with a sponge or dauber and must be allowed to stand until they dry of evaporation or of their own accord, which is quite often very slow, especially in damp weather. Liquid blackings, as used with a sponge, render the leather hard and unpliable and liable to crack. It is also impossible with a sponge or dauber to apply blacking evenly and smoothly, or with the present liquid blackings to produce a good shine without frequently cleaning off the old blacking on the shoe.

I am aware, also, that there are paste or dry blackings which must be moistened each time before being used, while the blacking which I have invented, being in a liquid state, is always ready for immediate use, and at the same time, being applied and polished with an ordinary blacking-brush, quickly produces a smooth and glossy polish, and the shoe never needs to be oiled or the old blacking cleaned off.

In order that any one may fully understand and be able to manufacture my blacking, I will describe the proportionate quantity I use of the various ingredients, and explain my method of compounding the same in order to obtain the best results.

I dissolve one-third of a pint of granulated sugar in two-thirds of a pint of linseed-tea and boil together into a thick sirup. Add one-fourth of a pint of sweet-oil, and then mix well with one pint of ivory-black. Add one-half pint more of linseed-tea and stir well into a thin paste. Then add one-sixth of a pint of the oil of vitriol. Mix well and allow to cool, then add one-twelfth of a pint of extract of nux vomica. Add to this a pint of strong wormwood-tea. Dissolve one tea-spoonful of alum in two pints of linseed-tea. Dissolve one ounce of Diamond black dye in ten pints of linseed-tea and one pint of vinegar. Add one pint of whisky and stir all well together over a fire for ten minutes, heated to that degree that the mixture would boil if not prevented by stirring. Then let stand a week and repeat the same process of heating and stirring for about ten minutes. Now bottle and cork tightly for use. The linseed-tea is made by mixing one ounce of linseed in four quarts of water and reducing one-third by boiling over a slow fire. The wormwood-tea is made by dissolving the extract from one-fourth ounce wormwood in one pint of water. The nux vomica is in liquid form and of a strength equal to the extract from one ounce nux vomica dissolved in one-fourth pint of alcohol.

While I have described certain exact proportions and a formula for compounding the same, small variations in the amounts or the compounding of the same ingredients in a different manner would obtain substantially the same results.

What I claim as new, and desire to secure by Letters Patent of the United States, is—

A boot and shoe blacking or polish composed of ivory-black, sugar, linseed-tea, sweet-oil, Diamond black dye, oil of vitriol, whisky, wormwood-tea, extract of nux vomica, vinegar, and alum, in substantially the proportions hereinbefore described.

Signed at New York, in the county of New York and State of New York, this 29th day of September, A. D. 1888.

CHARLES D. ST. PIERRE.

Witnesses:
LAURENCE A. McCARTHY,
ALBERT SCHIFFERS.